(12) United States Patent
Seifert

(10) Patent No.: US 6,931,368 B1
(45) Date of Patent: Aug. 16, 2005

(54) FLIGHT CONTROL DISPLAY FOR USE IN AN AIRCRAFT COCKPIT AND IN AIRCRAFT SIMULATION SYSTEMS

(75) Inventor: Jost Seifert, Munich (DE)

(73) Assignee: EADS Deutschland GmbH, Munich (DE)

( * ) Notice: Subject to any disclaimer, the term of this patent is extended or adjusted under 35 U.S.C. 154(b) by 986 days.

(21) Appl. No.: 09/715,070

(22) Filed: Nov. 20, 2000

(30) Foreign Application Priority Data

Nov. 19, 1999 (DE) ................................ 199 55 664

(51) Int. Cl.$^7$ .......................... G06F 17/50; G09B 19/16
(52) U.S. Cl. .............................. 703/8; 434/43; 434/44; 434/51
(58) Field of Search .......................... 703/6, 8; 701/16; 340/974; 434/38, 43, 44, 49, 51, 41; 345/582

(56) References Cited

U.S. PATENT DOCUMENTS

| | | | | |
|---|---|---|---|---|
| 4,016,658 A | * | 4/1977 | Porter et al. ................... | 434/41 |
| 4,241,519 A | * | 12/1980 | Gilson et al. .................. | 434/43 |
| 4,276,029 A | * | 6/1981 | Gilson et al. .................. | 434/43 |
| 4,313,726 A | * | 2/1982 | Chase .......................... | 434/42 |
| 4,343,037 A | * | 8/1982 | Bolton ......................... | 345/582 |
| 4,368,517 A | * | 1/1983 | Lovering ....................... | 701/16 |
| 5,420,582 A | * | 5/1995 | Kubbat et al. ................. | 340/974 |
| 5,798,713 A | * | 8/1998 | Viebahn et al. ................ | 340/974 |

FOREIGN PATENT DOCUMENTS

| | | |
|---|---|---|
| DE | 39 04 077 C1 | 11/1989 |
| DE | 43 14 811 A1 | 5/1993 |

OTHER PUBLICATIONS

Rate et al., C.R. Radical Instrument Approach Plate Design: Map Dimensionality and Frame of Reference, Proceedings of IEEE 1994 National Aerospace and Electronics Conference, May 1994, pp. 651-658.*
Moller et al., H. Synthetic Vision for Improving Flight Control in Night, Poor Visability and Adverse Weather Conditions, AIAA/IEEE, Digital Avionics Systems Conference, Oct. 1993, pp. 286-291.*
Gillespie, A.R. Closing All the Loops, IEE Colloquium in Serious Low Flying, Feb. 1998, pp. 6/1-6/5.*
Kornfeld et al., R.P. Preliminary Flight Tests of Pseudo-Attitude Using Single Antenna GPS Sensing, The AIAA/IEEE/SAE Digital Avionics Systems Conference, Nov. 1998, pp. E56/1-E56/8.*
Ward et al., D.G. A Self-Designing Receding Horizon Optimal Flight Controller, IEEE, Proceedings of the American Control Conference, vol. 5, Jun. 1995; pp. 3490-3494.*

(Continued)

*Primary Examiner*—Russell Frejd
(74) *Attorney, Agent, or Firm*—Crowell & Moring LLP

(57) ABSTRACT

A flight control display shows a representation of terrain, the horizon, an aircraft with a fuselage and aircraft wings, and a gamma ladder. The observer has a viewing direction at least in a predefined attitude range, which viewing direction is directed along the momentary flight path. The aircraft is therefore rotated depending on its momentary angle of incidence and angle of yaw with respect to the observer's viewing direction. The representation of the terrain is obtained from the relative position of a geodetic system of coordinates $X_G$, $Y_G$, $Z_G$ and an aerodynamic system of axes of the airplane, in which case a reference line of the gamma ladder coincides with the horizon.

9 Claims, 2 Drawing Sheets

OTHER PUBLICATIONS

Cammarota, J.P. Research in a High-Fidelity Acceleration Environment, Proceedings of the IEEE 1989 National Aerospace and Electronics Conference, May 1989, pp. 778-782.*

Cammarota, J.P. Evaluation of Full-Sortie Closed Loop Simulated Aerial Combat Maneuvering on the Human Centrigfuge, Proceedings of the IEEE 1990 National Aerospace and Electronics Conference, May 1990, pp. 838-842.*

Moller et al., H. Synthetic Vision for Improving Flight Control in Night, Poor Visibility, and Adverse Weather Conditions, Digital Avionics Systems Conference, AIAA/IEEE, Oct. 1993, pp. 286-291.*

Bennett et al., C.T. Differential Optical Flow and the Control of Gaze During Passive Flight in a Virtual World, IEEE International Conference on Systems, Man and Cybernetics, Nov. 1989, pp. 752-754.*

Papelis, Y.E. Terrain Modeling in High-Fidelity Ground Vehicle Simulators, Proceedings of the Fifth Annual Conference on AI, Simulation, and Planning in High Autonomy Systems, Dec. 1994, pp. 48-54.*

* cited by examiner

FLIGHT CONTROL DISPLAY FOR USE IN AN AIRCRAFT COCKPIT AND IN AIRCRAFT SIMULATION SYSTEMS

BACKGROUND AND SUMMARY OF THE INVENTION

This application claims the priority of German patent document 199 55 664.4, filed 19 Nov. 1999, the disclosure of which is expressly incorporated by reference herein.

The invention relates to a flight control display for use in an aircraft cockpit and in aircraft simulation systems, particular to a display for displaying an artificial view of the outside world.

Displays with an artificial view are known for flight control applications in which the outside world is displayed in a more or less detailed fashion. In this case, the viewing direction on which the display is based is situated, for example, according to German Patent Document DE 43 14811 A1 in the direction of the longitudinal axis of the real or simulated aircraft. In other applications, the viewing direction for displaying the artificial view may also be selectable. In special applications, the viewing direction for displaying the artificial view is coupled with the pilot's head movement or even with his eye movement in order to display to him in a direct manner those areas of the outside world which are of immediate interest to him.

The disadvantage of these display methods is that aircraft-specific data, such as flight condition variables, must be taken into account and checked at any time during the operation. In flight phases with high maneuvering performance or high mission demands, this may result in an excessive stress to the pilot, requiring that he simultaneously take into account aircraft-specific parameters, which may largely be critical variables, as well as marginal conditions of the outside world.

German Patent Document DE 3904077 C1 discloses a display for providing the pilot with an orientation in space during a flight with high angles of incidence, and simultaneously with position information.

It is an object of the present invention to provide a flight control display for simulation applications and operational usage, by means of which the pilot can simultaneously detect, as ergonomically as possible, information concerning the outside as well as aircraft-specific condition variables.

This and other objects and advantages are achieved according to the invention by projecting a display of the actual or simulated aircraft onto the landscape base. In this manner, an artificial view is achieved in which couplings can be recognized between different axes of movement (for example, the coupling of the roll-yaw vibration), in which case the pilot does not have to derive such a coupling from other indicating elements. As a result, the pilot can initiate countermeasures or recognize maneuvering limits usually without any large intermediate steps of thought. The display of the control surface deflections provided according to the invention is helpful in this case, because the pilot learns in a graphic manner the reaction of the aircraft to the control surface deflections.

In the case of modern aircraft which utilize flight control by means of a computer (FCC), control surface deflection is dependent not only on pilot input but also on the flight condition. By simultaneously displaying the control surface deflections and the flight condition in the display according to the invention, the engineer developing the flight control software is permitted to directly recognize the relationships.

The invention provides a display in which the flight path is shown as uncoupled from the aircraft-fixed system of coordinates; that is, the pilot can (separately in each case) perceive the coordinate axes of the flight path, the aircraft-fixed coordinate axes as well as the flow angles (angle of incidence and angle of yaw) existing between these coordinate axes in a display.

Another advantage of the display according to the invention is the small required display screen diagonal. The reason is that the pilot's viewing direction normally extends in the flight direction, and the latter is always situated in the center of the display screen. The display screen cutout of conventional displays has the extended longitudinal axis of the aircraft in the center of the display screen. In the case of high angles of incidence or angles of yaw, the center of the display screen cutout therefore deviates considerably from the flight path, and therefore requires a larger display screen diagonal in order to also display the landscape in the flight direction.

Other objects, advantages and novel features of the present invention will become apparent from the following detailed description of the invention when considered in conjunction with the accompanying drawings.

DETAILED DESCRIPTION OF THE DRAWINGS

Figure 1:
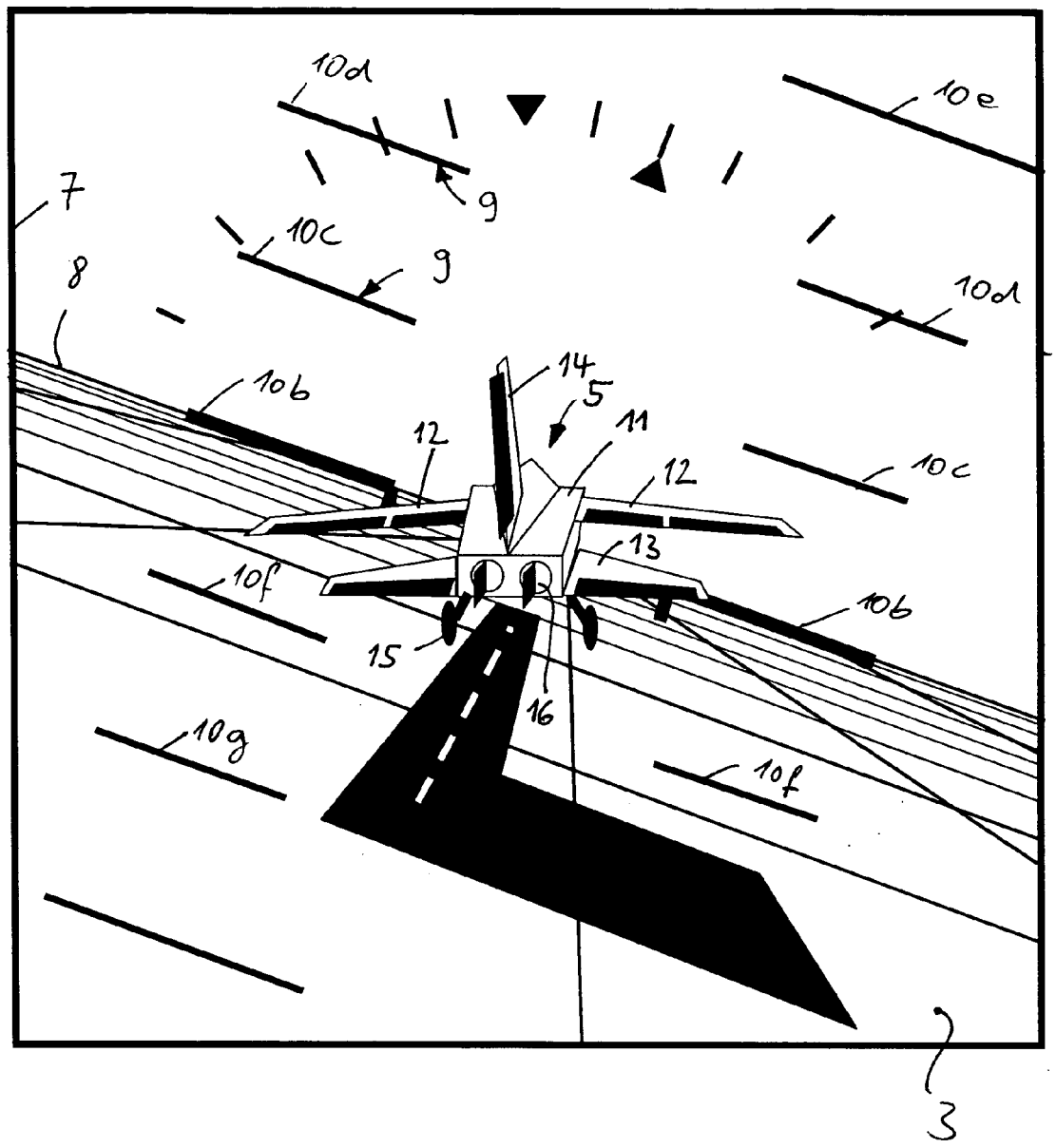
FIG. 1 is a simplified depiction of an embodiment of the display method according to the invention in which the simulated or flying aircraft is shown in a runway approach.

The flight control display method according to the invention depicted in FIG. 1 shows a display of terrain 3, an aircraft 5 as a surface model, a frame 7 which is shown in a first color—that is, black—and can be changed to a second color. The terrain 3 may be constructed as a checkerboard pattern (FIG. 1) or comprise a three-dimensional display of the terrain. Important reference points for the simulated flight or the operational use are preferably displayed in the terrain, such as air fields or radio facilities. The display of the terrain 3 comprises a horizon 8 if, under the particular flight conditions, it is situated within the displayed image cutout. The viewer of the display according to the invention locks in the direction of the momentary flight path of the flying or simulated aircraft 5. The flight control display according to the invention includes a gamma ($\gamma$) ladder 9, which is hereinafter referred to simply as a "ladder". The aircraft 5 is arranged with a central reference point 10 (FIG. 2), preferably with its center of gravity, in the display screen center or at least on the vertical bisecting line 10a of the display screen. A reference line 10b of the ladder 9 extends along the horizon 8. Starting from this reference line 10b, additional lines 10c, 10d, 10e, 10f, 10g are arranged in the vertical direction and at equal distances from one another parallel to the reference line 10b. The flight wind hang angle is displayed by means of a graduated representation 10h and an indicator 10i (FIG. 2) for showing the momentary flight wind hang angle in the upper half of the display screen.

According to the invention, the aircraft 5 is illustrated by means of a fuselage 11, aircraft wings 12, horizontal stabilizers and elevators 13, a rudder assembly 14, a landing gear 15—to the extent that it is extended—and jets 16. Preferably all control surfaces of the aircraft 5, and optionally the thrust vector control surfaces as well, are entered in the display. In simplified displays or as a function of the vehicle type, the horizontal stabilizers and elevators 13, the rudder assembly 14, the landing gear 15, and the jets 16 may also be omitted. The respective primary control surfaces, such as the wing flaps, the vertical rudders, the elevator controls of the aircraft—to the extent that they exist—are displayed on the aircraft 5. Secondary control surfaces, such as air deflectors, landing flaps as well as their positions can also be displayed. In the event that the landing gear 15 is retracted, the landing gear 15 is not shown in the flight control display.

The jets 16 can be displayed in different brightnesses or colors in order to indicate the extent of the power unit thrust. For example, a black representation of the jets 16 may mean that the power units are switched off; a white color of the jets 16 may mean that a maximal dry thrust exists; and a yellow color of the jets 16 may indicate that there is a maximal thrust with an afterburner.

Control flaps on the aircraft wings 12 as well as on the slat or high-lift flaps can be set off by means of certain colors or brightnesses without the display of the aircraft wings 12. During movements of the adjusting surfaces and of the slats and high-lift flaps, the size of their surface-type projection will also change in the flight control display. Correspondingly, the pilot can schematically detect the position of the control surfaces and possibly of the high-lift flaps and slats. Analogously, the position of the horizontal stabilizers and elevators 13 and of their control surfaces can also be shown. If, in the case of the real plane, which is to be flown or to be simulated, the horizontal stabilizers and elevators 13 move for controlling the aircraft, during the movement of the horizontal stabilizers and elevators 13, only the size of the projected elevator surface will change in the flight control display. When aircraft with a variable wing geometry are displayed, the momentarily adjusted sweep of the aircraft wings can also be shown by changing the surface of the aircraft wings 12 projected onto the display.

Figure 2:
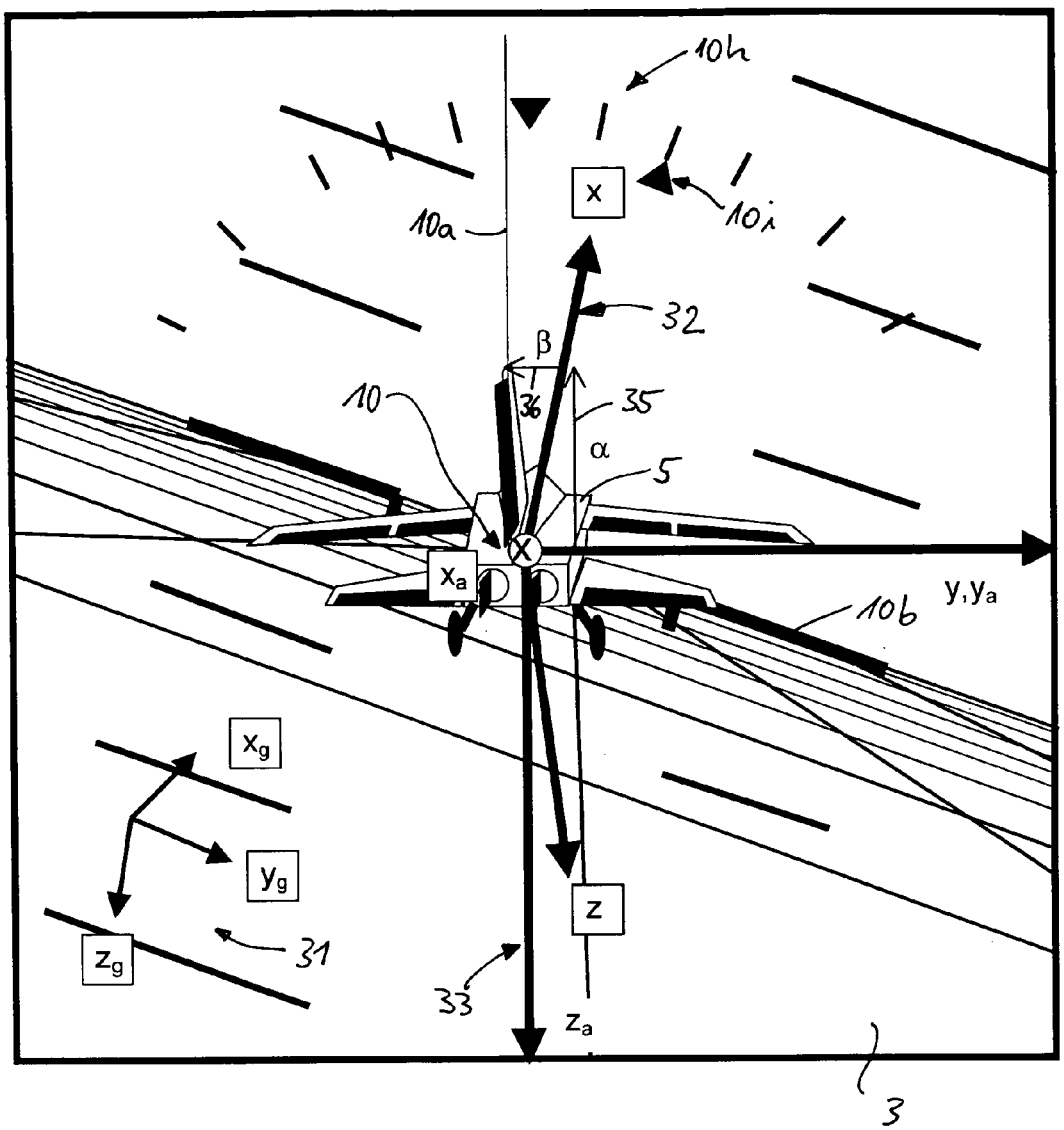
FIG. 2 is a view of the embodiment of the flight control display according to FIG. 1 with additional explanatory entries.

In order to explain the operation of the flight control display according to the invention in connection with changes of the flight condition, particularly the flight attitudes of the illustrated aircraft, FIG. 2 illustrates a geodetic system of coordinates 31 with the axes $X_g$, $Y_g$, $Z_g$ as well as an aircraft-fixed system of coordinates 32 with the axes X, Y, Z. FIG. 2 also shows the aerodynamic system of axes 33 with the axes $X_a$, $Y_a$, $Z_a$, as additional auxiliary vectors. In the following, definitions of systems of coordinates as well as of the angles of rotation situated between the latter are used as the basis which were set up in DIN Standard 9300, Part 1 of October 1990, which are known to those skilled in the art. In the real display according to the invention, the above-mentioned systems of coordinates are not displayed directly, but can be obtained indirectly from the display of the terrain 3 and of the aircraft as well as their orientations.

Under normal conditions, an approach flow exists which is time-variable in its direction and amount, so that, in the normal situation, the aircraft-fixed system of coordinates which the pilot can detect will deviate from the aerodynamic system of axes 33 which can be detected, as also illustrated in FIG. 2. Correspondingly, the angles by which with aircraft-fixed system of coordinates 32 is rotated with respect to the aerodynamic system of axes 33 indicate the momentary approach flow angle or angle of incidence 35 and the angle of yaw 36 of the displayed aircraft 5. In an auxiliary representation for a flight control display, the center of the aerodynamic system of axes 33 is situated in the display center, with its $X_a$ axis (symbolizing the flight direction vector) extending perpendicularly on the display screen, the $Y_a$ axis extends horizontally to the right (viewed by the observer), and the $Z_a$ axis for the orientation of the pilot points downward. In the representation according to the invention, in the (invisible) axes of the aerodynamic system of coordinates each flight condition as well as of the path points of the flight path are situated in this direction. When the angle of incidence is reduced, the vertical angle in the display according to the invention is also reduced at which the viewer sees the aircraft 5 with respect to its longitudinal axis, and vice versa.

The angle of yaw 36 (that is, the horizontal deviation of the viewing direction to the longitudinal axis of the aircraft) can be detected in a manner analogous to the angle of incidence 35. By virtue of the direct detectability of the angle of incidence 35 and of the angle of yaw 36, flight-mechanical relationships can immediately be observed from the display. These include particularly the angle of incidence and the angle of yaw itself, the position of the aircraft 5 in space, as well as flight-mechanical movement forms, such as the roll-yaw coupling. As a result of this representation, the pilot can immediately recognize the flight situation relevant to the control. The detectability is a result of the fact that the geodetic system of coordinates 31 and the aerodynamic system of coordinates 33 can be seen from the display. The rotation of the systems of coordinates 31, 33 with respect to one another permits detection of the flight wind azimuth angle, of the flight wind angle of inclination and of the flight wind hang angle from the representation according to the invention. When the aircraft 5 banks, the position of the aircraft-fixed system of coordinates 32 will change relative to the geodetic system of coordinates 31. As a result of the positions which the aircraft-fixed system of coordinates 32 has relative to the geodetic system of coordinates 31, the pilot can directly detect the position of the aircraft in space.

Relative to the viewer, the flight control display according to the invention is always aligned with the viewing direction extending in the flight direction $X_a$ (that is, is directed against the flight wind axis). In the auxiliary representation of FIG. 2, this corresponds to reference point 10. In the case of deviations of the longitudinal direction of the aircraft 5 from the path axis (thus in the case of a change of the angle of incidence and angle of yaw), a corresponding rotation of the aircraft-fixed system of coordinates 32 occurs with respect to the aerodynamic system of axes 33. As a result, the aircraft 5 is also rotated in the display. The aircraft 5 is therefore illustrated with a deviation of its longitudinal axis from the observer's viewing direction if this plane does not point precisely in the flight direction.

When the flight path angle is enlarged, the horizon 9 in the flight control display will move downward. As of a certain size of the flight path angle, the horizon 9 will disappear from the flight control display.

For displaying warnings, the frame 7 can be changed in a predefined color, for example, red.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A flight control display which shows a representation of an aircraft projected onto a display screen showing terrain, a horizon and a gamma ladder, wherein:

the observer has a viewing direction, as depicted in the display screen, which is directed along a momentary flight directon of the aircraft;

an aircraft-fixed system of coordinates is uncoupled from said flight direction, such that the aircraft is shown rotated relative to said viewing direction in the display screen, as a function of a momentary approach flow angle of the aircraft;

the terrain is represented as one of a grid pattern and a three-dimensional depiction; and the terrain, including the horizon, is oriented in said display screen as a function of a relative orientation of a geodetic system of coordinates and an aerodynamic system of coordinates defined by the momentary flight direction of the aircraft.

2. The flight control display according to claim 1, wherein important orientation points for the pilot are included in the representation of the terrain.

3. The flight control display according to claim 1, wherein primary control surfaces of the aircraft and their momentary deflections are depicted in the display.

4. The flight control display according to claim 3, wherein secondary control surfaces and their momentary positions are also depicted.

5. The flight control display according to claim 1, further comprising a frame which is colored in a predefined color for indicating warnings.

6. An aircraft flight control display comprising a video screen having depicted therein:

a representation of terrain proximate to the aircraft; and an aircraft, whose spatial orientation defines an aircraft fixed system of axes, and whose direction of movement defines an aerodynamic system of axes; wherein, the aerodynamic system of axes are depicted in said display with a fixed viewing orientation relative to the video screens;

the aircraft is centered in the video screen;

the direction of movement of the aircraft extends perpendicularly to the screen surface; and the aircraft fixed system of axes is uncoupled from the aerodynamics system of axes, such that the aircraft is shown rotated relative to said fixed viewing orientation in said display, depending on a momentary approach flow angle of the aircraft.

7. A method of displaying aircraft flight control information, said method comprising:

providing a video display unit having a display screen surface;

displaying on said video display unit, graphic depictions showing:

a representation of terrain proximate to an aircraft for which flight control information is displayed; and the aircraft, whose spatial orientation defines an aircraft fixed system axes, and whose direction of movement defines an aerodynamic system of axes;

wherein the aerodynamic system of axes are depicted in said display with a fixed viewing orientation relative to the video screen;

the aircraft is centered in the video screen;

the direction of movement of the aircraft extends perpendicularly to the screen surface; and the aircraft fixed system of axes is uncoupled from the aerodynamics system of axes, such that the aircraft is shown rotated relative to said fixed viewing orientation in said display, depending on a momentary approach flow angle of the aircraft.

8. The display according to claim 6, wherein the terrain is depicted with an orientation relative to said video screen, as a function of relative orientation of said aerodynamic system of axes and a geodetic system of axes which is fixed relative to said terrain.

9. The display according to claim 7, wherein the terrain is depicted with an orientation relative to said display screen, as a function of relative orientation of said aerodynamic system of axes and a geodetic system of axes which is fixed relative to said terrain.

* * * * *